US012792379B2

(12) United States Patent
Davidson et al.

(10) Patent No.: US 12,792,379 B2
(45) Date of Patent: Nov. 10, 2026

(54) RESOURCE MANAGEMENT WITH INTERMEDIARY NODE IN KUBERNETES ENVIRONMENT

(71) Applicant: Databricks, Inc., San Francisco, CA (US)

(72) Inventors: Aaron Daniel Davidson, Berkeley, CA (US); Thomas Garnier, Kirkland, WA (US); Lin Guo, Redmond, WA (US); Zhe He, Bellevue, WA (US); Manlin Li, Belleview, WA (US); Yang Liu, Redmond, CA (US); Feng Wang, San Francisco, CA (US); Hong Zhang, Lake Forest Park, WA (US); Weirong Zhu, Bellevue, WA (US)

(73) Assignee: Databricks, Inc., San Francisco, CA (US)

( * ) Notice: Subject to any disclaimer, the term of this patent is extended or adjusted under 35 U.S.C. 154(b) by 436 days.

(21) Appl. No.: 18/368,919

(22) Filed: Sep. 15, 2023

(65) Prior Publication Data

US 2025/0094195 A1 Mar. 20, 2025

(51) Int. Cl.
*G06F 9/455* (2018.01)
*G06F 9/54* (2006.01)

(52) U.S. Cl.
CPC .......... *G06F 9/45558* (2013.01); *G06F 9/547* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 12,229,600 | B1 * | 2/2025 | Datta | G06F 9/5077 |
| 2019/0042319 | A1 * | 2/2019 | Sood | G06F 21/74 |
| 2019/0377591 | A1 * | 12/2019 | Dimitrov | H04L 63/20 |
| 2020/0150972 | A1 * | 5/2020 | Ketkar | G06F 9/44505 |
| 2022/0327001 | A1 * | 10/2022 | Ferreira | G06F 9/5077 |

OTHER PUBLICATIONS

Wikipedia.com, "API Server," Kubernetes, Wikipedia: The Free Encyclopedia, Sep. 19, 2023, 3 pages, Retrieved from the internet <URL:https://en.wikipedia.org/wiki/Kubernetes#API_server>.

* cited by examiner

*Primary Examiner* — Wynuel S Aquino
(74) *Attorney, Agent, or Firm* — Fenwick & West LLP

(57) ABSTRACT

A resource management configuration may receive an API request from an API server. The API request specifies task information from a plurality of tenants. The configuration transmits status information of a plurality of VMs to the API server to assign tasks to one or more VMs based on the task information and the status information. Tasks assigned to a VM of the plurality of VMs are for one tenant of the plurality of tenants. The configuration configures on an untrusted network, network security groups for managing communications of tenants such that a network security group configured for a tenant permits communications between VMs assigned to the same tenant but prevents communications between VMs assigned to different tenants. The configuration pins each assigned VM of the one or more assigned VMs to perform the task based on the task information of the corresponding tenant.

20 Claims, 6 Drawing Sheets

RESOURCE MANAGEMENT WITH INTERMEDIARY NODE IN KUBERNETES ENVIRONMENT

TECHNICAL FIELD

The disclosed configuration relates generally to resource management, and more particularly to resource management for cloud-based object computing systems.

BACKGROUND

As cloud computing continues to grow, computing services take advantage of the clustered resources, e.g., physical central processing unit (CPU), memory and storage, of cloud computing providers. To access these physical resources, the cloud computing provider provides a virtual machine (VM) for a computing service to have access to the physical computing resources. Container technologies such as Kubernetes also have grown to operate a cluster of virtual machines (VMs). With container technology, a primary agent, such as a Kubenetes application programming interface (API) server in the Kubernetes environment, creates a pod that has multiple containers. Each pod may include multiple containers, and a pod is scheduled to a node as a whole. A cluster may include a set of nodes, and each node is a machine where containers (workloads) are deployed. For multi-tenant safe container technology, containers are associated with a virtual machine (VM) within which the computing service is operating. Tenants are individuals, companies, data services, and other entities that may request cloud-based computing resources, for example, object storage data management.

In a current Kubernetes cluster, the primary agent has a view of the entire cluster. Each node runs a computing agent which can access the primary agent. The computing agents may access information related to different tenants. Workloads from different tenants may be scheduled to the same VM, and there is no built-in network isolation between VMs. The current container environments, e.g., Kubernetes, are not sufficiently restricted to meet the multi-tenancy safety requirements.

The figures depict various embodiments of the present configuration for purposes of illustration only. One skilled in the art will readily recognize from the following discussion that alternative embodiments of the structures and methods illustrated herein may be employed without departing from the principles of the configuration described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

The disclosed configurations beneficially include a system (and/or a method) for resource management. The system may receive an application programming interface (API) request from an API server. The API request specifies task information from a plurality of tenants. The configuration transmits status information of a plurality of virtual machines (VMs) to the API server to assign tasks to one or more VMs based on the task information and the status information. Tasks assigned to a VM of the plurality of VMs are for one tenant of the plurality of tenants. The system configures on an untrusted network, network security groups for managing communications of tenants such that a network security group configured for a tenant permits communications between VMs assigned to the same tenant but prevents communications between VMs assigned to different tenants. The system pins (e.g., assigns to a specific resource) each assigned VM of the one or more assigned VMs to perform the task based on the task information of the corresponding tenant.

In this way, each VM can only communicate to an intermediary node and communicate with the API server via the intermediary node. A VM can only access information about itself. Workloads from different tenants cannot be assigned to the same VM. The system provides a network security group for each tenant to provide network isolation between VMs. As such, the disclosed system improves a multi-tenants security and reduces performance cost and security concerns.

Figure 1:
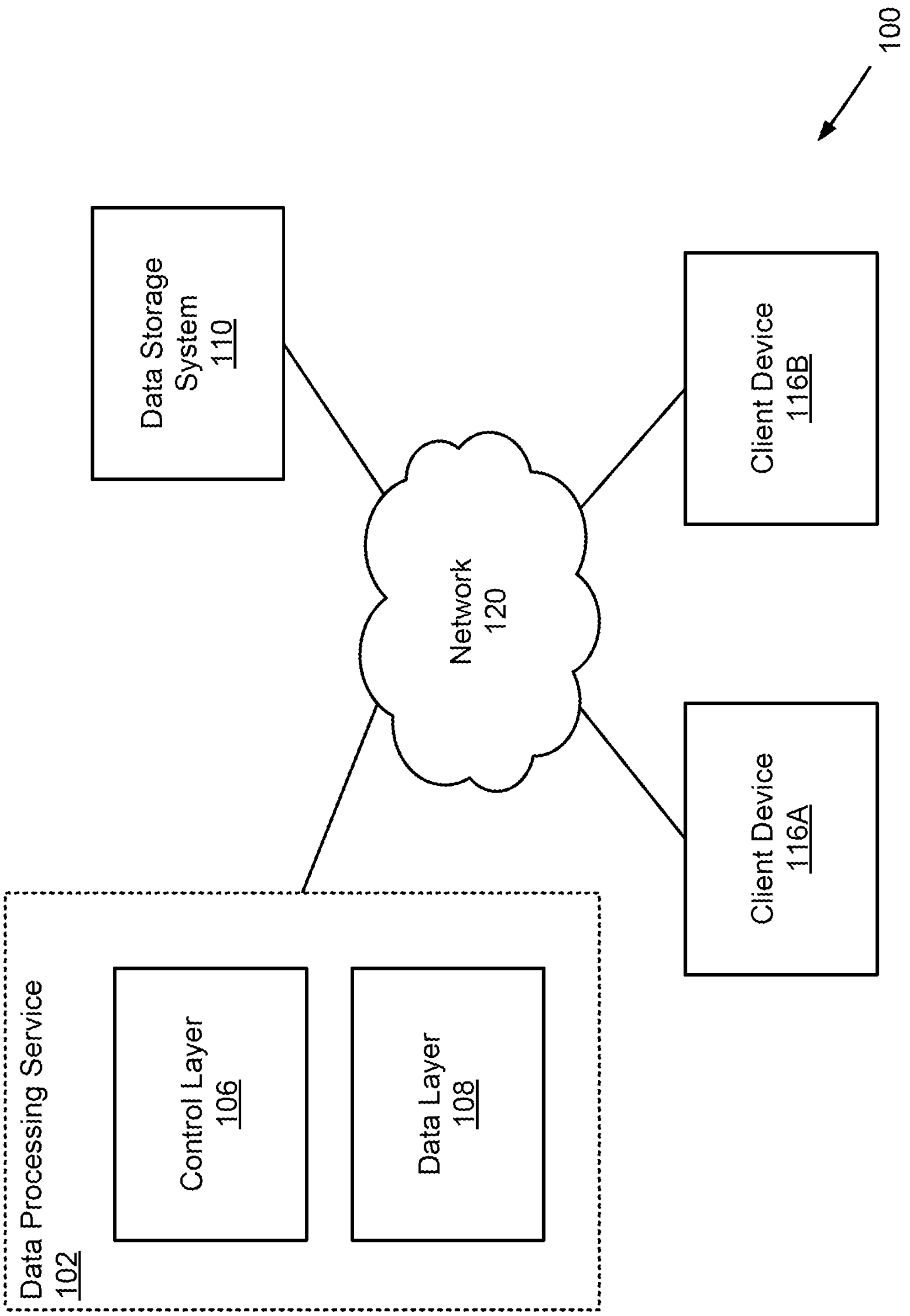
FIG. 1 is a high-level block diagram of a system environment for a data processing service, in accordance with an embodiment.

Referring now to FIG. 1, illustrated a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. Accordingly, a single instance of the software and its supporting infrastructure serves multiple customers, each customer associated with multiple users that may access the multi-tenant system. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 106 via the network 120. In another embodiment, the client device 116 interacts with the various systems of the system environment 100 through an application programming interface (API) running on a native operating system of the client device 116, such as IOS® or ANDROID™.

Example Data Storage System

Figure 2:
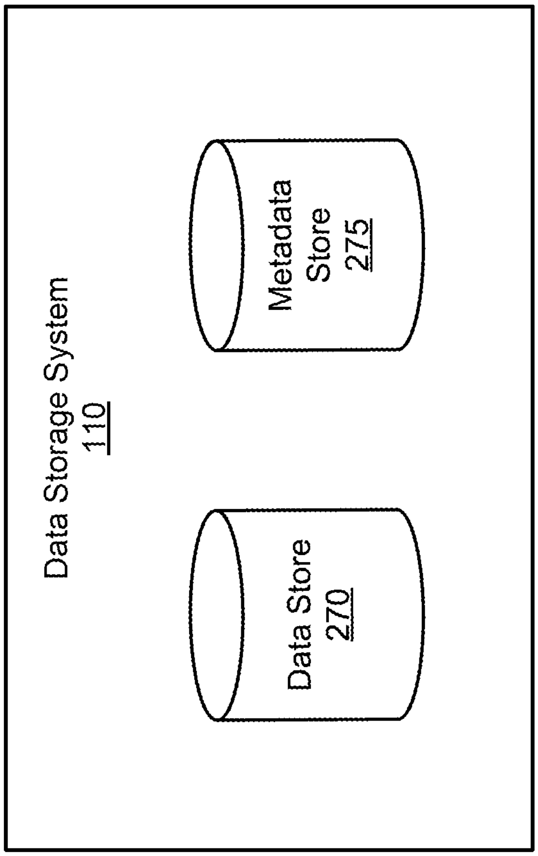
FIG. 2 illustrates a block diagram of an architecture of a data storage system, in accordance with an embodiment.

FIG. 2 is a block diagram of an architecture of a data storage system 108, in accordance with an embodiment. In one embodiment, the data storage system 108 includes a data ingestion module. The data storage system 110 also includes a data store 260 and a metadata store 275.

The data store 260 stores data associated with different tenants of the data processing service 102. In one embodiment, the data in data store 260 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 260 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 108. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity, and may indicate the specific changes to individual records with an indication of whether the record was inserted, deleted, or updated due to the corresponding transaction.

Figure 3:
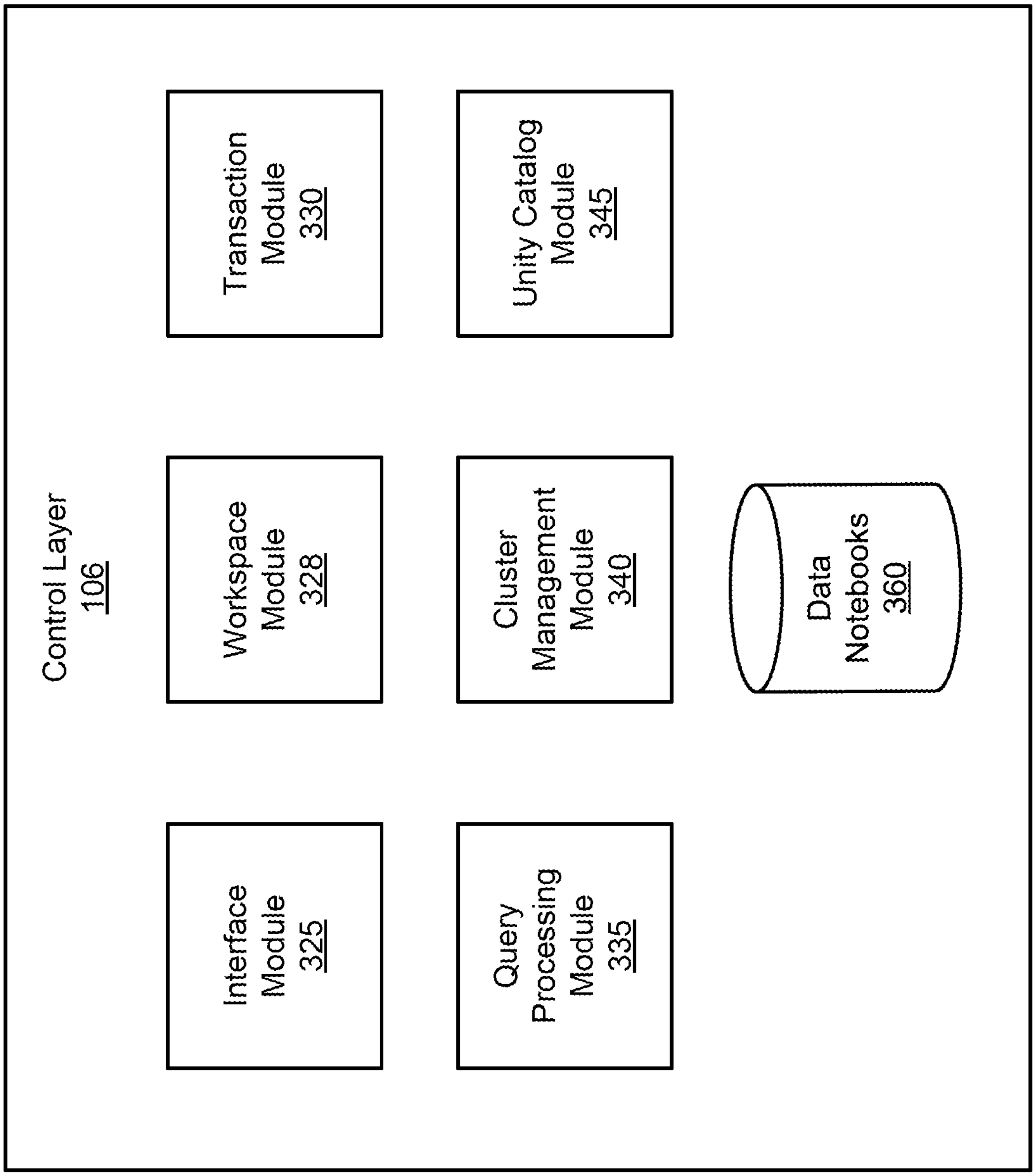
FIG. 3 illustrates a block diagram of an architecture of a control layer, in accordance with an embodiment.

FIG. 3 is a block diagram of an architecture of a control layer 106, in accordance with an embodiment. In one embodiment, the data processing system 106 includes an interface module 325, a transaction module 330, a query processing module 335, and a cluster management module 340. The control layer 106 also includes a data notebook store 360.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module 325.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The workspace module 328 deploys workspaces within the data processing service 102. A workspace as defined herein may refer to a deployment in the cloud that functions as an environment for users of the workspace to access assets. An account of the data processing service 102 represents a single entity that can include multiple workspaces. In one embodiment, an account associated with the data processing service 102 may be associated with one workspace. In another embodiment, an account may be associated with multiple workspaces. A workspace organizes objects, such as notebooks, libraries, dashboards, and experiments into folders. A workspace also provides users access to data objects, such as tables or views or functions, and computational resources such as cluster computing systems.

In one embodiment, a user or a group of users may be assigned to work in a workspace. The users assigned to a workspace may have varying degrees of access permissions to assets of the workspace. For example, an administrator of the data processing service 102 may configure access permissions such that users assigned to a respective workspace are able to access all of the assets of the workspace. As another example, users associated with different subgroups may have different levels of access, for example users associated with a first subgroup may be granted access to all data objects while users associated with a second subgroup are granted access to only a select subset of data objects.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. The query processing module 335 may encounter runtime errors during execution of a database query and returns information describing the runtime error including an origin of the runtime error representing a position of the runtime error in the database query. In one embodiment, the query processing module 335 provides one or more queries to appropriate clusters of the data layer 108, and receives responses to the queries from clusters in which the queries are executed.

The unity catalog module 345 is a fine-grained governance solution for managing assets within the data processing service 102. It helps simplify security and governance by providing a central place to administer and audit data access. In one embodiment, the unity catalog module 345 maintains a metastore for a respective account. A metastore is a top-level container of objects for the account. The metastore may store data objects and the permissions that govern access to the objects. A metastore for an account can be assigned to one or more workspaces associated with the account. In one embodiment, the unity catalog module 345 organizes data as a three-level namespace, a catalogue is the first layer, a schema (also called a database) is the second layer, and tables and views are the third layer.

In one embodiment, the unity catalog module 345 enables read and write of data to data stored in cloud storage of the data storage system 110 on behalf of users associated with an account and/or workspace. In one instance, the unity catalog module 345 manages storage credentials and external locations. A storage credential represents an authentication and authorization mechanism for accessing data stored on the data storage system 110. Each storage credential may be subject to access-control policies that control which users and groups can access the credential. An external location is an object that combines a cloud storage path (e.g., storage path in the data storage system 110) with a storage credential that authorizes access to the cloud storage path. Each storage location is subject to access-control policies that control which users and groups can access the storage credential. Therefore, if a user does not have access to a storage credential in the unity catalog module 345, the unity catalog module 345 does not attempt to authenticate to the data storage system 110.

In one embodiment, the unity catalog module 345 allows users to share assets of a workspace and/or account with users of other accounts and/or workspaces. For example, users of Company A can configure certain tables owned by Company A that are stored in the data storage system 110 to be shared with users of Company B. Each organization may be associated with separate accounts on the data processing service 102. Specifically, a provider entity can share access to one or more tables of the provider with one or more recipient entities.

Responsive to receiving a request from a provider to share one or more tables (or other data objects), the unity catalog module 345 creates a share in the metastore of the provider. A share is a securable object registered in the metastore for a provider. A share contains tables and notebook files from the provider metastore that the provider would like to share with a recipient. A recipient object is an object that associates an organization with a credential or secure sharing identifier allowing that organization to access one or more shares of the provider. In one embodiment, a provider can define multiple recipients for a given metastore. The unity catalog module 345 in turn may create a provider object in the metastore of the recipient that stores information on the provider and the tables that the provider has shared with the recipient. In this manner, a user associated with a provider entity can securely share tables of the provider entity that are stored in a dedicated cloud storage location in the data storage system 110 with users of a recipient entity by configuring shared access in the metastore.

The cluster management module 340 manages the clusters. For example, the cluster management module 340 may take the user data processing requests and assign clusters to the request. In some embodiments, the cluster management module 340 may implement workload isolations for running untrusted applications inside the clusters.

Example Cluster Compute System

Figure 4:
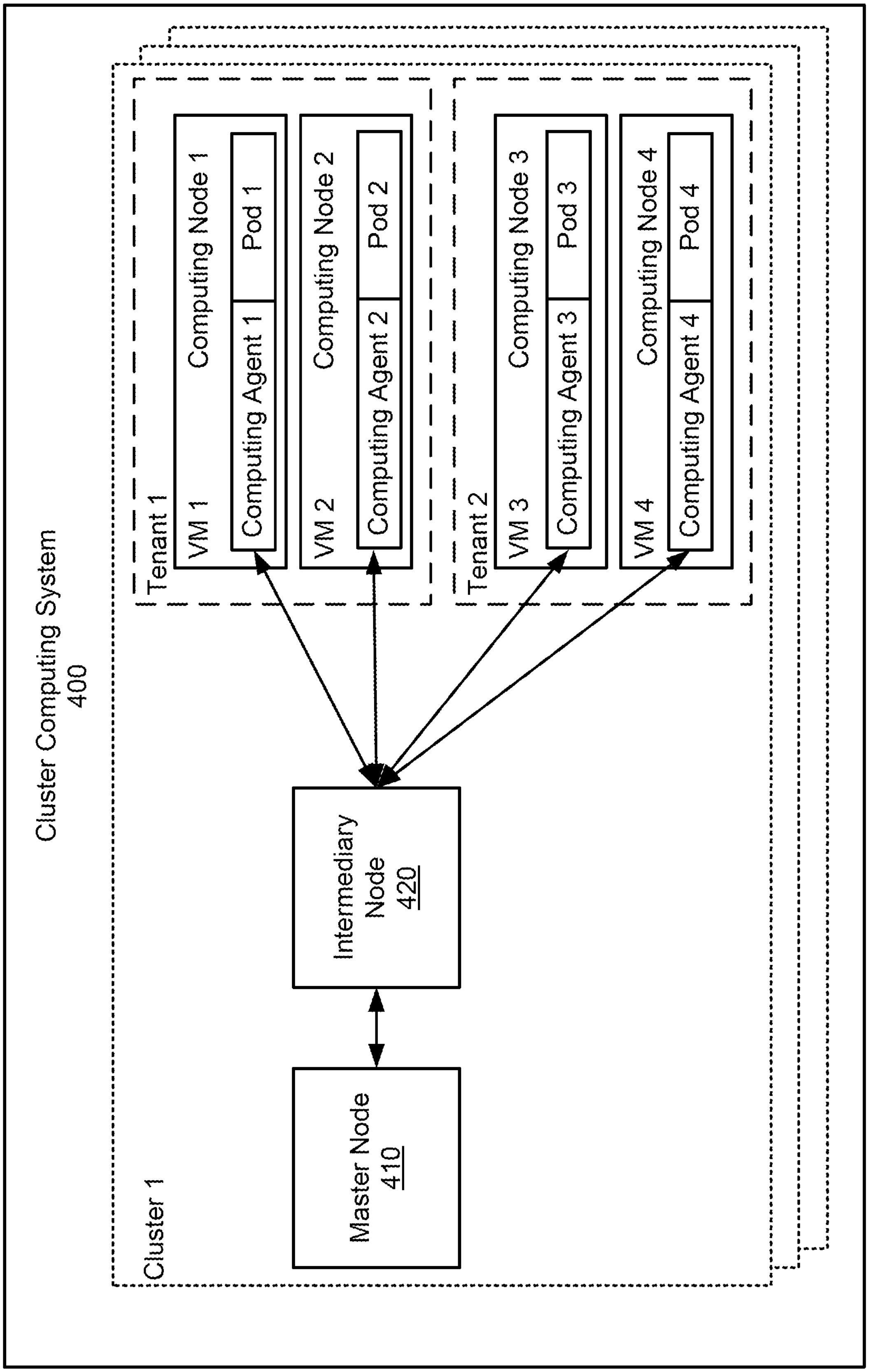
FIG. 4 illustrates a block diagram of an architecture of a cluster computing system of the data layer, in accordance with an embodiment.

Referring now to FIG. 4, it illustrates a block diagram of an architecture of a cluster computing system 400, in accordance with an embodiment. In some embodiments, the cluster computing system 400 includes a plurality of clusters. Each cluster is a set of nodes or machines that run containerized applications. As shown in FIG. 4, a cluster may include a master node 410, an intermediary node 420, and a pool including multiple computing nodes. The architectural components may be configured to structure a computer system to operate as specified herein. The computer system may include some or all of the components of a machine as further described with FIG. 6.

Example Master Node

The master node 410 receives one or more tasks for execution. The master node 410 manages workloads and selects a computing node that an unscheduled pod runs based on resource availability and constrains (e.g., whether related to work from a same tenant). For example, the master node 410 may schedule the work to the computing nodes based on resource requirements, resource availability, and other user-provided constraints or policies. The master node 410 may receive the computing node status and pod status from the computing nodes. In some embodiments, the master node 410 tracks resource allocation on each computing node to ensure that workload is not scheduled in excess of available resources. In some implementations, the master node 410 may also provide feedback, logs and status updates about the task executions to the user.

The master node 410 is responsible for the scheduling and management of the whole cluster. For example, the master node 410 may schedule and assign tasks received from a plurality of tenants (e.g., M number of tenants) to a plurality of computing nodes (e.g., N number of computing nodes) to perform the tasks. In some embodiments, the master node 410 may include a primary agent, e.g., an API server. The API server is at the center of the whole cluster, providing addition, deletion, modification and query functions for various resource objects (e.g., computing nodes) of the cluster, and data interaction and communication between other modules. The API server may receive related parameters such as a development dependency library and system configurations required by a customer for the master node 410 to generate tasks by using the parameters. The master node 410 determines a suitable computing node to run a pod to perform the tasks, and pins the computing node to perform the assigned task, e.g., sending the binding information and task scheduling information via the API server to the computing node. In one embodiment, a computing node is a virtual machine (VM). The master node 410 ensures that a VM, at any time, is only assigned with tasks associated with one same tenant, and the VM will not be reused until it is securely reset. A pod is the basic execution unit of an application. The pod encapsulates an application's container(s), storage resources, a unique network Internet Protocol (IP) address, and options which govern how the container(s) should execute. Each pod runs a single instance of a given application. A container is a portable executable image that contains software and all of its dependencies. The containers in a pod are co-located on the same VM in the cluster and share resources including networking and storage resources. The master node 410 manages the computing nodes and the pods in the cluster.

Example Computing Node

The pool can include any appropriate number of computing nodes (e.g., 4 computing nodes, 12 computing nodes, 256 computing nodes). Each computing node may be identified by an identifier, e.g., a node ID. Each computing node in the pool includes one or more execution engines (not shown) for executing one or more tasks of a task stage. In one embodiment, an execution engine performs single-threaded task execution in which a task is processed using a single thread of the CPU. The computing node distributes one or more tasks to the one or more execution engines.

In one embodiment, a computing node may include a computing agent that manages pods and containers in the pods. The computing agent is responsible for staring, stopping, and maintaining application containers in the pod as directed by the master node 410. For example, each computing agent may register node information with the API server, periodically reports the resource usage status to the master node 410, and monitors the resources of the corresponding computing node and containers. In some embodiments, the computing agent may manage tasks, such as scheduling pods, starting containers, maintaining and/or stopping the pods/containers.

Example Intermediary Node

The intermediary node 420 provides a service (e.g., a serverless service) running between the computing node 410 and the pool of computing nodes. In one embodiment, the intermediary node 420 is associated with an intermediary agent that protects the API server from access by the computing agents of the computing nodes. The intermediary agent may register the computing nodes to the API server. The intermediary agent receives information from the API server and transmits the information to the corresponding computing agent. For example, the intermediary agent may receive an API request from the API server, and the API request may specify task information associated with a plurality of tenants. The intermediary agent may poll status information of the computing nodes and transmit the status information to the API server so that the API server may assign tasks to the computing nodes based on the status information and the task information. In one implementation, the intermediary agent may pass task scheduling information to the assigned computing executor nodes and ensure that a computing agent can only receive exactly required information to manage the corresponding computing node. The task scheduling information may include information associated with the assigned computing node, such as node, pod, and container specifications, etc. In some embodiments, the task scheduling information may be a pod JSON object that may be received and stored by the computing agent. The computing agent fetches the corresponding task scheduling information from the intermediary agent and configures the computing node based on the specifications.

The intermediary agent may continuously monitor the status of the computing nodes. For example, the intermediary agent may watch the latest specifications for the computing node from the API server and return the specifications to the computing node agents of the corresponding computing nodes. The computing node agent uploads the latest status of the corresponding computing node to the intermediary agent, and the intermediary agent may report the status to the API server. In some embodiments, the intermediary agent may ensure a computing node is indeed in use. When a computing node has completed an assigned task, the intermediary agent may report its status to the API server so that the API server may send instructions to reset and/or reuse the computing node.

The intermediary node may configure on an untrusted network, network security groups (e.g., firewalls) for managing communications between the computing nodes. An untrusted network refers to a network environment where there is a high risk of data compromise, unauthorized access, and potential threats from malicious entities. For example, on an untrusted network, a computing node forming a task associated with one tenant may access information associated with a different tenant, e.g., via communications among the computing nodes or communications between the master node and the computing nodes. In another example, a computer node may run an untrusted code that makes the network untrusted. In one implementation, the intermediary node configures the network security groups that are associated with tenants and configured to permit communications between computing nodes assigned to the same tenant but prevents communications between computing nodes that are assigned to different tenants.

Resource Management With an Intermediary Node

Figure 5:
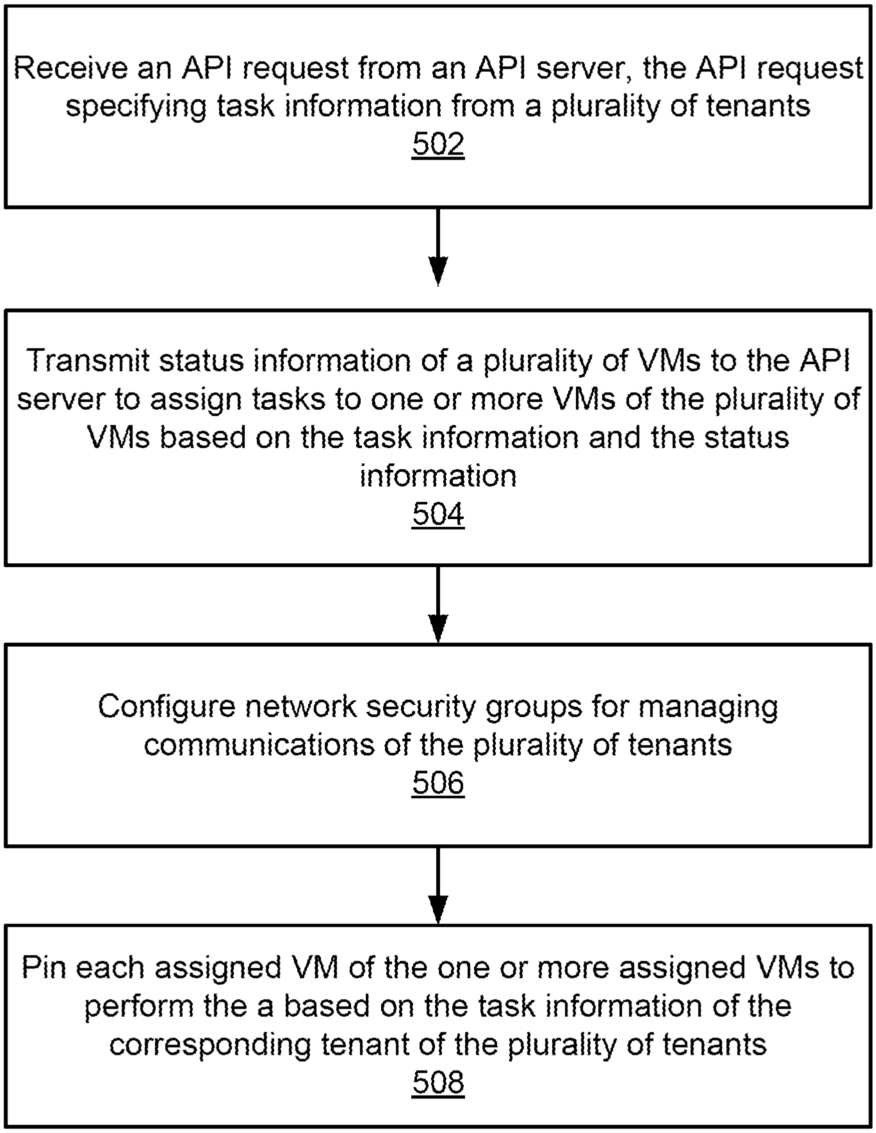
FIG. 5 illustrates a method for performing resource management with an intermediary node, in accordance with an embodiment.

FIG. 5 is a flowchart of a method for managing a cluster with an intermediary node, in accordance with an embodiment. The process shown in FIG. 5 may be performed by one or more components (e.g., the control layer 106) of a data processing system/service (e.g., the data processing service 102). Other entities may perform some or all of the steps in FIG. 5. For example, the data processing service 102 may include an intermediary node (e.g., the intermediary node 420) in a cluster for performing the steps in FIG. 5. The data processing service 102 as well as the other entities may include some or of the component of the machine (e.g., computer system) described in conjunction with FIG. 6. Embodiments may include different and/or additional steps, or perform the steps in different orders.

The intermediary node receives 502 an API request from an API server. The intermediary node may run on a trusted network. A trusted network may be implemented with strong access controls, encryptions, intrusion detection and prevention so that the data and resources are protected from unauthorized access, data breaches, and malicious activities. For example, on a trusted network, a tenant may not access data/information related to a different tenant. The API request may specify task information from two or more tenants. For example, the task information may include query requests, analytics requests, or machine learning and artificial intelligence requests, and the like.

The intermediary node transmits 504 status information of a plurality of virtual machines (VMs) to the API server so that the API server may assign tasks to one or more VMs of the plurality of VMs based on the task information and the status information. In one implementation, each VM is associated with a computing node in a cluster. Tasks assigned to a VM of the plurality of VMs are for one tenant of the plurality of tenants. In some embodiments, each assigned VM may perform one or more tasks associated with the same tenant of the plurality of tenants.

In one example, the status information may indicate that a VM is performing a task associated with a tenant. The intermediary node may transmit this status information to the API server so that the API server does not assign a task from a different tenant to this VM. Alternatively, the API server may receive the status information of the VM and assign a task from the same tenant to the same VM.

The intermediary node configures 506, on an untrusted network, network security groups for managing communications of tenants. In one implementation, a network security group for a tenant permits communications between VMs assigned to the same tenant but prevents communications between VMs that are assigned to different tenants. In one embodiment, the network security group is a firewall that isolates different application instances to ensure zero date exchange between VMs assigned to different tenants. In some embodiments, a VM is registered into a cluster via the intermediary node to ensure a secure bootstrap following a secure protocol. A VM from a VPC (virtual private cloud) may be securely and uniquely identified. For example, if the VM is taken by an attacker (e.g., by breaking out the container), the attacker cannot impersonate a different VM or register the VM to a different node to receive workloads.

The intermediary node pins 508 each assigned VM to perform the task based on the task information of the corresponding tenant. For example, the intermediary node may send (transmit) the binding information and task scheduling information to the assigned VM. In one implementation, the intermediary node passes task scheduling information to the assigned VMs and ensures that a VM can only receive required information to manage the corresponding computing node. The task scheduling information may include information associated with the assigned VM, such as node, pod, and container specifications, etc. In some embodiments, the task scheduling information may be a pod JSON object. The VM fetches the corresponding task scheduling information and configures the VM based on the specifications included in the task scheduling information to perform the assigned task.

The intermediary node may continuously monitor the status of the VMs. In one implementation, the VMs may upload the latest status information of the corresponding VM to the intermediary node, and the intermediary node may report the status information to the API server. In one implementation, the status information of a VM may indicate the VM has completed the assigned tasks, and the intermediary node may report the status to the API server. The VM may receive an instruction from the master node to reset this VM. The master node may detect the VM's status from API server, terminate the VM, and remove the corresponding computing node from the API server. The VM receives the instruction and reset itself. In one example, the API server ensures that a VM will not be reused until it has been reset. In another example, an API request specifies a task information (e.g., a new task) from a tenant (e.g., Tenant 1), and the latest status information of the assigned VMs indicates one of the assigned VMs (e.g., VM 1) is performing a current task (e.g., an ongoing task that has not been completed) associated with this tenant, Tenant 1. In this case, the master node may assign the new task from Tenant 1 to the same assigned VM, VM1 (e.g., during or after the performance of the current task).

In this way, each VM can only communicate to the intermediary node and communicate with an API server via the intermediary node. A VM can only access information about itself. Workloads from different tenants cannot be assigned to the same VM. The network security groups provide network isolations between VMs. As such, the disclosed configuration improves a multi-tenants security, reduces performance cost and security concerns.

Figure 6:
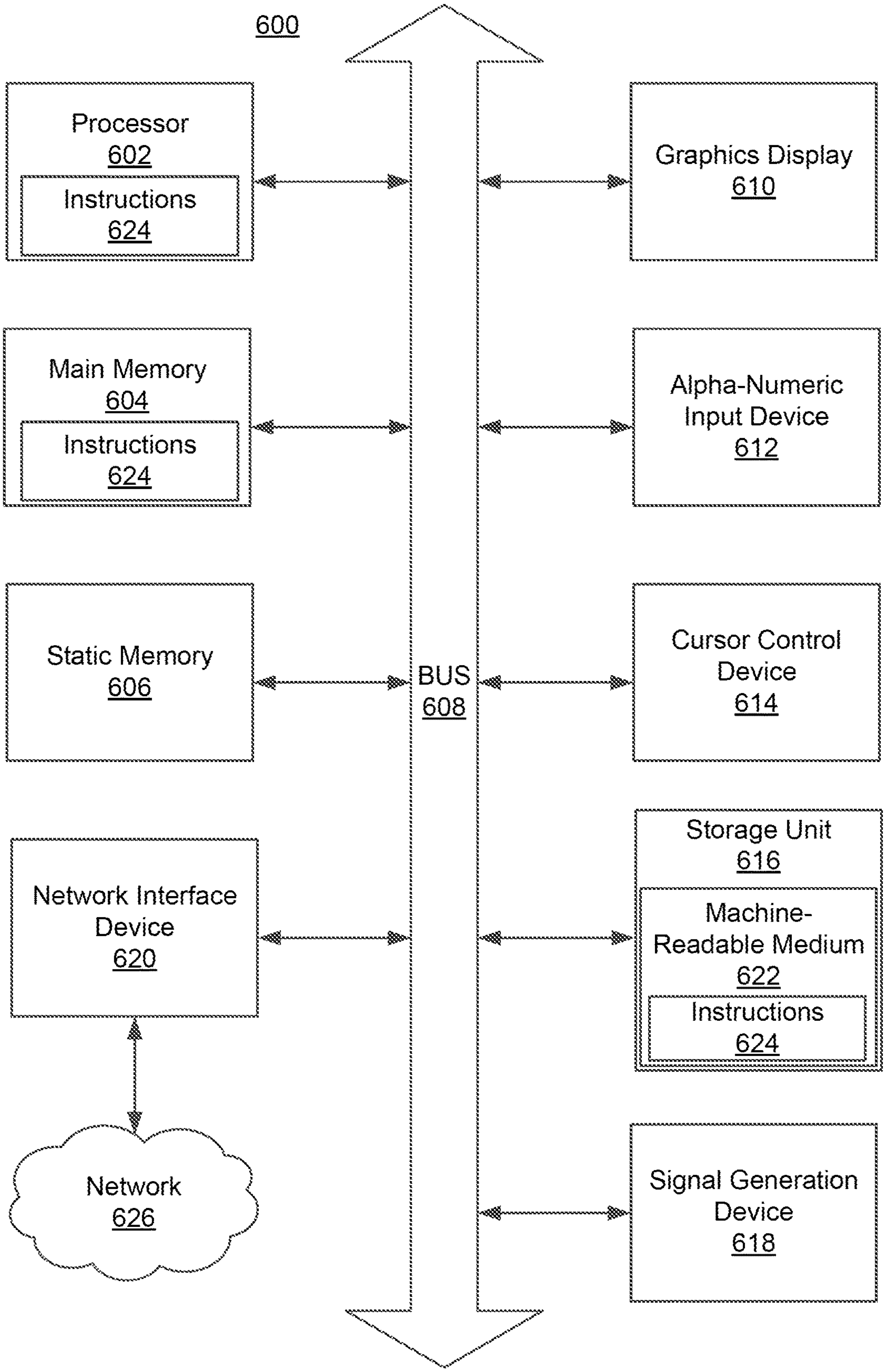
FIG. 6 is a diagram of an example computing device architecture in accordance with one embodiment.

Turning now to FIG. 6, illustrated is an example machine to read and execute computer readable instructions, in accordance with an embodiment. Specifically, FIG. 6 shows a diagrammatic representation of the data processing service 102 (and/or data processing system) in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 800. The computer system 600 also includes a main memory 604. The computer system may include a storage unit 616. The processor 602, memory 604, and the storage unit 616 communicate via a bus 608.

In addition, the computer system 600 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include instructions for implementing the functionalities of the transaction module 330 and/or the file management module 335. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626, such as the network 120, via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONFIGURATION CONSIDERATIONS

The disclosed configurations beneficially provide a system (and/or a method) for resource management. The system receives an API request from an API server. The API request specifies task information from a plurality of tenants. The system transmits status information of a plurality of VMs to the API server to assign tasks to one or more VMs based on the task information and the status information. Tasks assigned to a VM of the plurality of VMs are for one tenant of the plurality of tenants. The system configures on an untrusted network, network security groups for managing communications of tenants such that a network security group configured for a tenant permits communications between VMs assigned to the same tenant but prevents communications between VMs assigned to different tenants. The system pins each assigned VM of the one or more assigned VMs to perform the task based on the task information of the corresponding tenant. In this way, the disclosed configuration makes the cluster a multi-tenant safe computing environment that is capable to run untrusted user code, thus improving the multi-tenant security and reducing performance cost and security concerns.

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method comprising:

receiving, by a processor running on a trusted network, an application programing interface (API) request from an API server, the API request specifying task information from a plurality of tenants, wherein the processor is associated with an intermediary node interposed between the API server and a plurality of virtual machine (VMs), wherein each VM of the plurality of VMs is configured to communicate with the API server via the intermediary node and each VM of the plurality of VMs accesses only information about itself;

transmitting, by the intermediary node, status information of the plurality of VMs to cause the API server to assign tasks to one or more VMs of the plurality of VMs based on the task information and the status information, wherein tasks assigned to a VM of the one or more VMs are for one tenant of the plurality of tenants;

receiving, by the intermediary node from the API server, information describing the assigned tasks for the one or more VMs;

configuring, by the intermediary node, on an untrusted network, network security groups for managing communications of the plurality of tenants such that a network security group configured for a tenant of the plurality of tenants permits communications between VMs assigned to a same tenant of the plurality of tenants but prevents communications between VMs assigned to different tenants of the plurality of tenants; and pinning, by the intermediary node, each assigned VM of the one or more VMs to perform one or more assigned tasks for a corresponding tenant of the plurality of tenants.

2. The method of claim 1, wherein each VM performs tasks associated with the same tenant.

3. The method of claim 1, further comprising:

receiving, by the intermediary node, status information of each assigned VM from the one or more VMs; and transmitting, by the intermediary node, the received status information to the API server.

4. The method of claim 1, further comprising:

receiving, by the intermediary node, status information from a first VM of the plurality of VMs, the status information indicating that the first VM has completed an assigned task;

transmitting, by the intermediary node, the received status information to the API server;

receiving, by the intermediary node, an instruction via API server to reset the first VM; and transmitting, by the intermediary node, the received instruction to the first VM to cause the first VM to reset.

5. The method of claim 1, further comprising:

receiving, by the intermediary node, a first API request from the API server, the first API request specifying first task information from a first tenant of the plurality of tenants;

receiving, by the intermediary node, status information for each assigned VM from the one or more VMs;

determining, by the intermediary node, that a first VM is an assigned VM that is performing a current task associated with the first tenant; and transmitting, by the intermediary node, status information of the first VM to the API server, causing the API server to assign the first task to the first VM based on the first task information and the determination.

6. The method of claim 1, further comprising:

receiving, by the intermediary node, a first task information related to an assigned VM of the one or more VMs from the API server; and transmitting, by the intermediary node, the first task information to the assigned VM so that the first task information related to the assigned VM is not accessed by a different VM of the plurality of VMs.

7. The method of claim 1, wherein the network security group includes a firewall.

8. A non-transitory computer-readable medium comprising stored instructions executable by one or more processors of an intermediary node operating in a trusted network, the instructions causing the one or more processors to execute operations comprised to:

receive, by the intermediary node, an application programing interface (API) request from an API server, the API request specifying task information from a plurality of tenants, wherein the intermediary node is interposed between the API server and a plurality of virtual machine (VMs), wherein each VM of the plurality of VMs is configured to communicate with the API server via the intermediary node and each VM of the plurality of VMs accesses only information about itself;

transmit, by the intermediary node, status information of the plurality of VMs to cause the API server to assign tasks to one or more VMs of the plurality of VMs based on the task information and the status information, wherein tasks assigned to a VM of the one or more VMs are for one tenant of the plurality of tenants;

receiving, by the intermediary node from the API server, information describing the assigned tasks for the one or more VMs;

configure, by the intermediary node, on an untrusted network, network security groups for managing communications of the plurality of tenants such that a network security group configured for a tenant of the plurality of tenants permits communications between VMs assigned to a same tenant of the plurality of tenants but prevents communications between VMs assigned to different tenants of the plurality of tenants; and pin by the intermediary node, each assigned VM of the one or more VMs to perform one or more assigned tasks for a corresponding tenant of the plurality of tenants.

9. The non-transitory computer-readable medium of claim 8, wherein each VM performs tasks associated with the same tenant.

10. The non-transitory computer-readable medium of claim 8, wherein the instructions that when executed by one or more processors of the intermediary node, further cause the one or more processors to:

receive status information of each assigned VM from the one or more VMs; and transmit the received status information to the API server.

11. The non-transitory computer-readable medium of claim 8, wherein the instructions that when executed by one or more processors of the intermediary node, further cause the one or more processors to:

receive status information from a first VM of the plurality of VMs, the status information indicating that the first VM has completed an assigned task;

transmit the received status information to the API server;

receive an instruction via an API server to reset the first VM; and transmit the received instruction to the first VM to cause the first VM to reset.

12. The non-transitory computer-readable medium of claim 8, wherein the instructions that when executed by one or more processors of the intermediary node, further cause the one or more processors to:

receive a first API request from the API server, the first API request specifying first task information from a first tenant of the plurality of tenants;

receive status information for each assigned VM from the one or more VMs;

determine that a first VM is an assigned VM that is performing a current task associated with the first tenant; and transmit status information of the first VM to the API server, causing the API server to assign the first task to the first VM based on the first task information and the determination.

13. The non-transitory computer-readable medium of claim 8, wherein the instructions that when executed by one or more processors of the intermediary node, further cause the one or more processors to:

receive a first task information related to an assigned VM of the one or more VMs from the API server; and transmit the information to the assigned VM so that the first task information related to the assigned VM is not accessed by a different VM of the plurality of VMs.

14. The non-transitory computer-readable medium of claim 8, wherein the network security group includes a firewall.

15. A system comprising:

one or more computer processors of an intermediary node operating in a trusted network; and one or more computer-readable mediums storing instructions that, when executed by the one or more computer processors, cause the intermediary node to:

receive an application programing interface (API) request from an API server, the API request specifying task information from a plurality of tenants, wherein the intermediary node is interposed between the API server and a plurality of virtual machine (VMs), wherein each VM of the plurality of VMs is configured to communicate with the API server via the intermediary node and each VM of the plurality of VMs accesses only information about itself;

transmit status information of the plurality of VMs to cause the API server to assign tasks to one or more VMs of the plurality of VMs based on the task information and the status information, wherein tasks assigned to a VM of the one or more VMs are for one tenant of the plurality of tenants;

receive, from the API server, information describing the assigned tasks for the one or more VMs;

configure, by the intermediary node, on an untrusted network, network security groups for managing communications of the plurality of tenants such that a network security group configured for a tenant of the plurality of tenants permits communications between VMs assigned to a same tenant of the plurality of tenants but prevents communications between VMs assigned to different tenants of the plurality of tenants; and pin each assigned VM of the one or more VMs to perform one or more assigned tasks for a corresponding tenant of the plurality of tenants.

16. The system of claim 15, wherein each VM performs tasks associated with the same tenant.

17. The system of claim 15, wherein the instructions that, when executed by the one or more computer processors, cause the intermediary node to:

receive status information of each assigned VM from the one or more VMs; and transmit the received status information to the API server.

18. The system of claim 15, wherein the instructions that, when executed by the one or more computer processors, cause the intermediary node to:

receive status information from a first VM of the plurality of VMs, the status information indicating that the first VM has completed an assigned task;

transmit the received status information to the API server;

receive an instruction via the API server to reset the first VM; and transmit the received instruction to the first VM to cause the first VM to reset.

19. The system of claim 15, wherein the instructions that, when executed by the one or more computer processors, cause the intermediary node to:

receive a first API request from the API server, the first API request specifying first task information from a first tenant of the plurality of tenants;

receive status information for each assigned VM from the one or more VMs;

determine that a first VM is an assigned VM that is performing a current task associated with the first tenant; and transmit status information of the first VM to the API server, causing the API server to assign the first task to the first VM based on the first task information and the determination.

20. The system of claim 15, wherein the instructions that, when executed by the one or more computer processors, cause the intermediary node to:

receive a first task information related to an assigned VM of the one or more VMs from the API server; and transmit the information to the assigned VM so that the first task information related to the assigned VM is not accessed by a different VM of the plurality of VMs.

* * * * *